US012645252B2

(12) United States Patent
Williams et al.

(10) Patent No.: US 12,645,252 B2
(45) Date of Patent: Jun. 2, 2026

(54) DISPLAY SCREEN GLARE ADJUSTMENTS

(71) Applicant: HEWLETT-PACKARD DEVELOPMENT COMPANY, L.P., Spring, TX (US)

(72) Inventors: Alexander Morgan Williams, Spring, TX (US); Anthony Kaplanis, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 817 days.

(21) Appl. No.: 17/866,808

(22) Filed: Jul. 18, 2022

(65) Prior Publication Data

US 2024/0019894 A1　Jan. 18, 2024

(51) Int. Cl.
*G06F 1/16*　(2006.01)
*F16M 13/02*　(2006.01)

(52) U.S. Cl.
CPC ......... *G06F 1/1603* (2013.01); *F16M 13/022* (2013.01)

(58) Field of Classification Search
CPC .................................................... G06F 1/1603
See application file for complete search history.

(56) References Cited

U.S. PATENT DOCUMENTS

| | | | | |
|---|---|---|---|---|
| 6,594,089 B2 * | 7/2003 | Tanabe | ................... | G02B 27/62 |
| | | | | 353/31 |
| 8,854,802 B2 * | 10/2014 | Robinson | .............. | G06F 1/1637 |
| | | | | 361/679.21 |
| 2001/0055075 A1 * | 12/2001 | Wang | ..................... | F16M 11/10 |
| | | | | 349/58 |
| 2006/0170880 A1 * | 8/2006 | Dambach | ................. | H04N 5/74 |
| | | | | 349/5 |
| 2020/0373810 A1 * | 11/2020 | Channaiah | ............ | G06F 1/1652 |
| 2021/0212221 A1 * | 7/2021 | Diboine | ............... | H05K 5/0217 |
| 2022/0020119 A1 * | 1/2022 | Grace | ..................... | G06F 3/013 |

* cited by examiner

*Primary Examiner* — Hung S. Bui
*Assistant Examiner* — Elisa Sasserath
(74) *Attorney, Agent, or Firm* — Quarles & Brady LLP

(57) ABSTRACT

In one example in accordance with the present disclosure, an electronic device is described. The example electronic device includes a display screen and a sensor to capture sensor data of a glare reflecting off of the display screen onto a user of the electronic device. The example electronic device also includes an actuator device to adjust a position of the display screen. The example electronic device further includes a processor to generate an adjustment signal based on the sensor data. The adjustment signal is to cause the actuator device to adjust the position of the display screen to reduce the glare reflecting off of the display screen onto the user.

17 Claims, 9 Drawing Sheets

Electronic Device 300

Display Screen 312

Actuator Device 310

Base 322

Rotational Motion 324

700

Receive sensor data of a glare reflecting off of a display screen onto a user of the electronic device 702

Adjust the position of the display screen to reduce the glare reflecting off of the display screen onto the user 704

Machine-Readable Storage Medium    930

932    Receive Image Instructions

934    Determine Glare Instructions

936    Adjust Curvature Instructions

DISPLAY SCREEN GLARE ADJUSTMENTS

BACKGROUND

Electronic technology has advanced to become virtually ubiquitous in society and has been used to enhance many activities in society. For example, electronic devices are used to perform a variety of tasks, including work activities, communication, research, and entertainment. Different varieties of electronic circuits may be utilized to provide different varieties of electronic technology. In some cases, electronic devices may be used to display image data.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
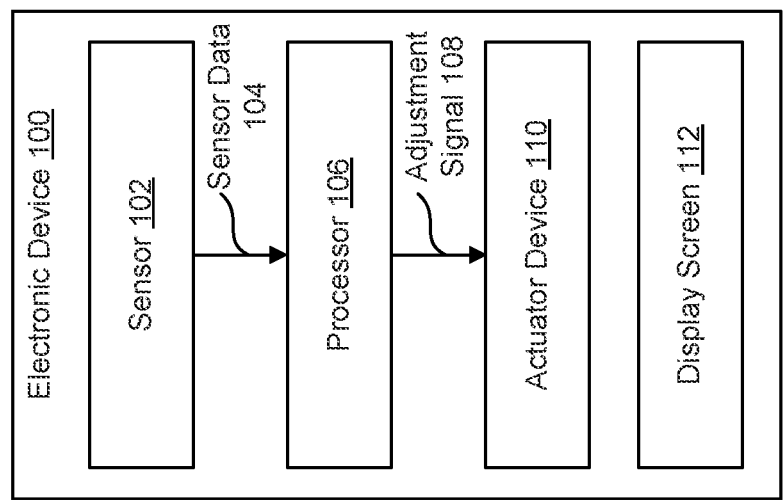
FIG. 1 is a block diagram of an electronic device to adjust display screen positions, according to an example.
Figure 1:

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, electronic devices may process image data for display by a display device. For example, a display device may produce a visual representation of an image or text by operating light-emissive circuitry represented as a number of pixels based on processed image data. A display device may provide a certain range of colors producible by the number of pixels. A display device may present (e.g., display) an image on a panel using monochrome (e.g., black and white) or color data (e.g., such as red, green, and blue (RGB) channel data) Colors displayed by a panel may be dependent on the color characteristics of the display panel. Examples of display devices include external monitors (e.g., flat panel monitors, curved panel monitors, etc.), integrated monitors (e.g., laptop computer displays, tablet computer displays, mobile device displays, etc.), and extended-reality displays (e.g., virtual-reality headsets, augmented reality headsets, etc.).

In some cases, while using an electronic device, light may reflect off of the display screen of the electronic device. For example, light from the sun or from artificial light sources may reflect off of the display screen. In some examples, the reflected light may result in glare on a user of the electronic device. As used herein, "glare" refers to concentrated light.

The glare may strike the eyes of the user, resulting in a distracting experience. In an example, while a user is on a video conference using the electronic device, a glare may be reflected off of the display screen and into the eyes of the user. This glare may make it difficult or painful for the user to see the display screen. In some cases, the user may move their head to avoid the glare. In other cases, the user may reposition the display screen to deflect the glare away from their eyes. However, in some cases, a user may not have physical access to the display screen. For instance, in a conference room setting, a user may far away from the display screen. In this case, the user may not be able to reach the display screen from their location or moving to adjust the display screen may distract from the video conference.

In the examples described herein, adjustments are made to the position of a display screen to reduce or eliminate glare on a user. In some examples, the electronic device includes a sensor (e.g., a camera) to detect the presence of a glare on the user. The electronic device may adjust the position of the display screen in response to the presence of the glare. For example, in the case of a flexible display screen, the electronic device may change the curvature of the display screen. In the case of a flat display screen, the electronic device may rotate the display screen. These changes to the position of the display screen may deflect the glare away from the face of the user without the user physically interacting with the electronic device.

In some examples, the present specification describes an electronic device. The example electronic device includes a display screen and a sensor to capture sensor data of a glare reflecting off of the display screen onto a user of the electronic device. The example electronic device also includes an actuator device to adjust a position of the display screen. The example electronic device further includes a processor to generate an adjustment signal based on the sensor data. The adjustment signal is to cause the actuator device to adjust the position of the display screen to reduce the glare reflecting off of the display screen onto the user.

In another example, the present specification also a method by an electronic device. The example method includes: (1) receiving sensor data of a glare reflecting off of a display screen onto a user of an electronic device; and (2) adjusting the position of the display screen to reduce the glare reflecting off of the display screen onto the user.

In yet another example, the present specification also describes a non-transitory machine-readable storage medium comprising instructions executable by a processor to: (1) receive an image of a user of an electronic device; (2) determine that a glare reflects off of a display screen onto a face of the user in the image, the display screen comprising a flexible screen having a curvature; and (3) adjust the curvature of the display screen to reduce the glare reflecting off of the display screen onto the user.

As used in the present specification and in the appended claims, the term, "processor" may be a controller, an application-specific integrated circuit (ASIC), a semiconductor-based microprocessor, a central processing unit (CPU), a graphics processing unit (GPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement the functionality described herein.

Turning now to the figures, FIG. 1 is a block diagram of an electronic device 100 to adjust display screen positions, according to an example. The electronic device 100 may include a display device. Examples of display devices include external monitors, integrated monitors, extended-reality displays, and other devices that render image data on a display screen 112 for view by an observer.

The electronic device 100 includes a processor 106. The processor 106 of the electronic device 100 may be implemented as dedicated hardware circuitry. In some examples, the dedicated hardware circuitry may be implemented as a controller (e.g., an embedded controller), an application-specific integrated circuit (ASIC), a semiconductor-based microprocessor, a central processing unit (CPU), and a field-programmable gate array (FPGA), and/or other hardware device.

In some examples, a memory (not shown) may be implemented in the electronic device 100. The memory may be dedicated hardware circuitry to host instructions for the processor 106 to execute. The memory may take many types of memory including volatile and non-volatile memory. For example, the memory may include Random Access Memory (RAM), Read Only Memory (ROM), optical memory disks, and magnetic disks, among others.

The electronic device 100 may also include instructions. The instructions may be implemented in a platform specific language that the processor 106 may decode and execute. The instructions may be stored in the memory during execution. In some examples, the instructions may include instructions to adjust the position of the display screen 112 in response to a glare measurement 104, according to the examples described herein.

The electronic device 100 includes a display screen 112. In some examples, the display screen 112 includes circuitry to render an image for viewing (e.g., by a user). The display screen 112 may include a panel (e.g., a liquid crystal display (LCD) panel, a light-emitting diode (LED) panel, an organic LED (OLED) panel, a plasma panel, an electronic paper (E Ink) panel) that emits or reflects light to generate a viewable image. In some examples, the display screen 112 includes an exterior surface (e.g., glass, polymer, etc.) to enclose and protect the interior circuitry of the display screen 112. In some examples, light from a source external to the display screen 112 may be reflected off of the exterior surface of the display screen 112. In some examples, light from a source external to the display screen 112 may pass through the exterior surface of the display screen 112 and may reflect off of an interior surface of the display screen 112.

In some examples, the display screen 112 may be a fixed-shape screen where the display screen retains a given shape. For example, the display screen 112 may be a flat display screen in which the shape of the display screen 112 remains in a plane. In some examples, the display screen 112 may be a curved display screen in which the shape of the display screen 112 remains with a fixed curvature.

In some examples, the display screen 112 may be a flexible display screen in which the shape of the display screen 112 may change. For example, with a flexible display screen, the curvature of the display screen 112 may change. In some examples, the change in curvature may be generalized over the entire display screen 112. In some examples, the curvature of a portion of the display screen 112 may change. As used herein, a "local curvature" refers to a curvature of a portion of the display screen 112 that differs from the curvature of other portions of the display screen 112. Thus a change in the local curvature refers to a change in the curvature in a given portion of the display screen 112. In some examples, a change in the local curvature of a flexible display screen may occur in one portion of the display screen 112 while the curvature in other portions of the display screen 112 remain unchanged.

As discussed above, in some cases, light may reflect off of the display screen 112 to create a glare on a user viewing the display screen 112. An example of this scenario is described in FIG. 2.

Figure 2:
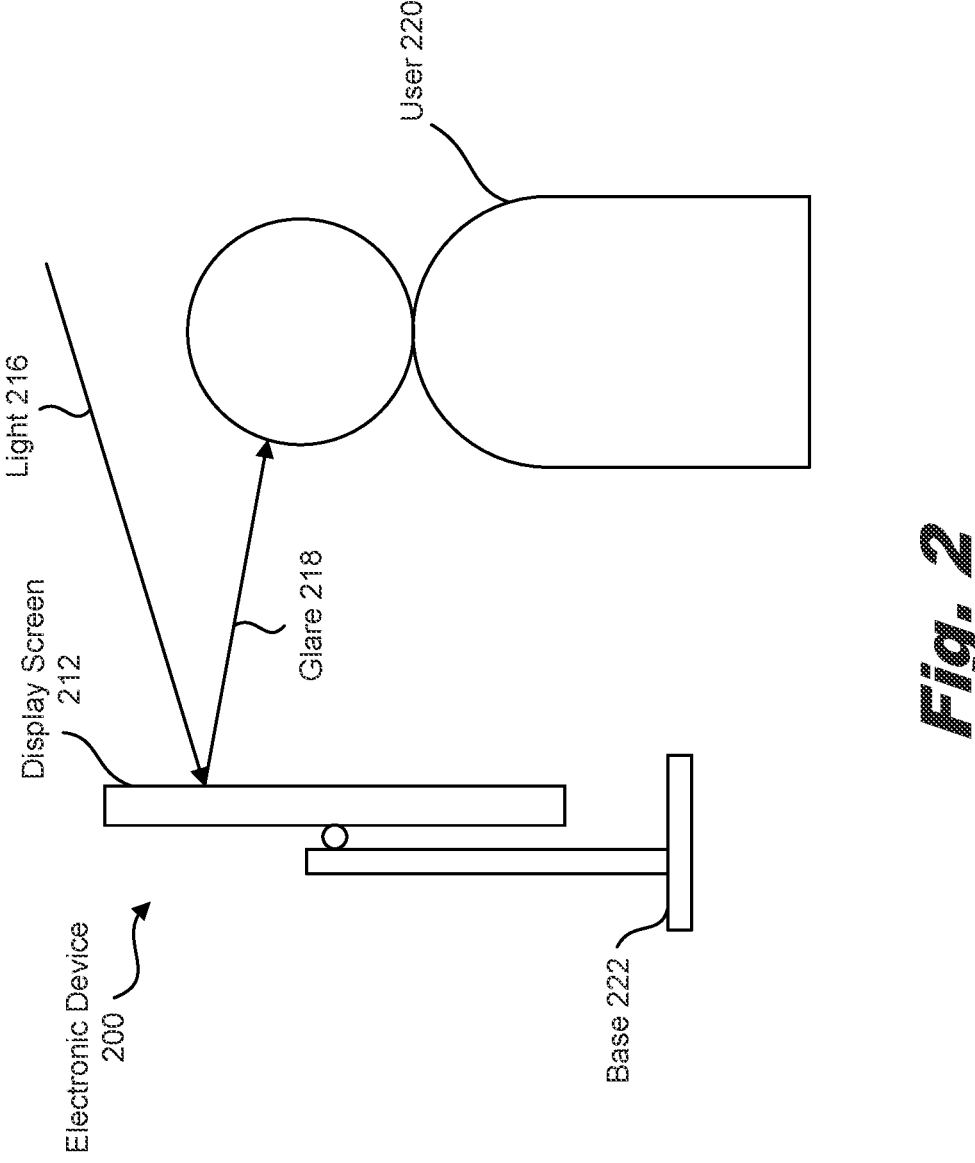
FIG. 2 illustrates glare reflecting off a display screen onto a user, according to an example.

Turning briefly to FIG. 2, in an example, the electronic device 200 is supported by a base 222. For example, the electronic device 200 may be an external monitor or a mobile device placed on the base 222. In this case, a user 220 views the display screen 212. Light 216 from a source external to the electronic device 200 impacts the display screen 212. In this case, the display screen 212 acts as a mirror to reflect the light 216 as a glare 218 that shines on the face of the user 220. This glare 218 may be distracting and/or painful to the user 220.

Returning now to FIG. 1, the electronic device 100 includes a sensor 102 to capture sensor data 104 of the glare reflecting off of the display screen 112 onto a user of the electronic device 100. In some examples, the sensor 102 may measure light. For example, the sensor data may capture measurements of light conditions that indicate that glare is present on the user. In some examples, the sensor 102 is a camera (e.g., visible-light camera, infrared camera, ultraviolet (UV) camera, etc.) that captures a digital image of the user. For instance, the sensor 102 may be a forward-facing camera (e.g., a webcam) that faces toward the user of the electronic device 100. In other examples, the sensor 102 may be a non-camera device that measures light. Some examples of non-camera devices that may be used as a sensor 102 to measure light include infrared cameras, ambient light sensors, and ambient color sensors.

In some examples, the sensor 102 may be integrated within the electronic device 100. In some examples, the sensor 102 may be external to the electronic device 100 but may communicate with the electronic device 100 via a wired or wireless communication channel.

The electronic device 100 includes an actuator device 110 to adjust a position of the display screen 112. As used herein, the term "adjust a position" refers to changes in the shape or location of the display screen 112. In some examples, the actuator device 110 may include an electromechanical device (or a plurality of electromechanical devices) to change the shape or location of the display screen 112. Examples of the actuator device 110 include electric motors, stepper motors, jackscrews, electric muscular stimulators, magnetic actuators (e.g., solenoids), hydraulic actuators, pneumatic actuators, shape-memory alloy, or other devices that cause a change in shape to the display screen 112 in response to a control signal. The actuator device 110 may also include interface mechanisms (e.g., linkages, shafts, cables, chains, membranes, etc.) to connect the actuator device 110 to the display screen 112 and facilitate changes in the position of the display screen 112.

In some examples, the actuator device 110 may cause the display screen 112 to rotate about an axis. For example, the actuator device 110 may include a motor located in the stand of the display screen 112. In this example, the motor may cause the display screen 112 to rotate about an axis (e.g., a horizontal axis or a vertical axis). In some examples, the actuator device 110 changes the curvature of a flexible display screen 112. Examples of an actuator device 110 that rotates the display screen 112 about an axis are described in FIGS. 3 and 4. Examples of an actuator device 110 that changes the curvature of the display screen 112 are described in FIGS. 5A-5B and FIG. 6.

Figure 3:
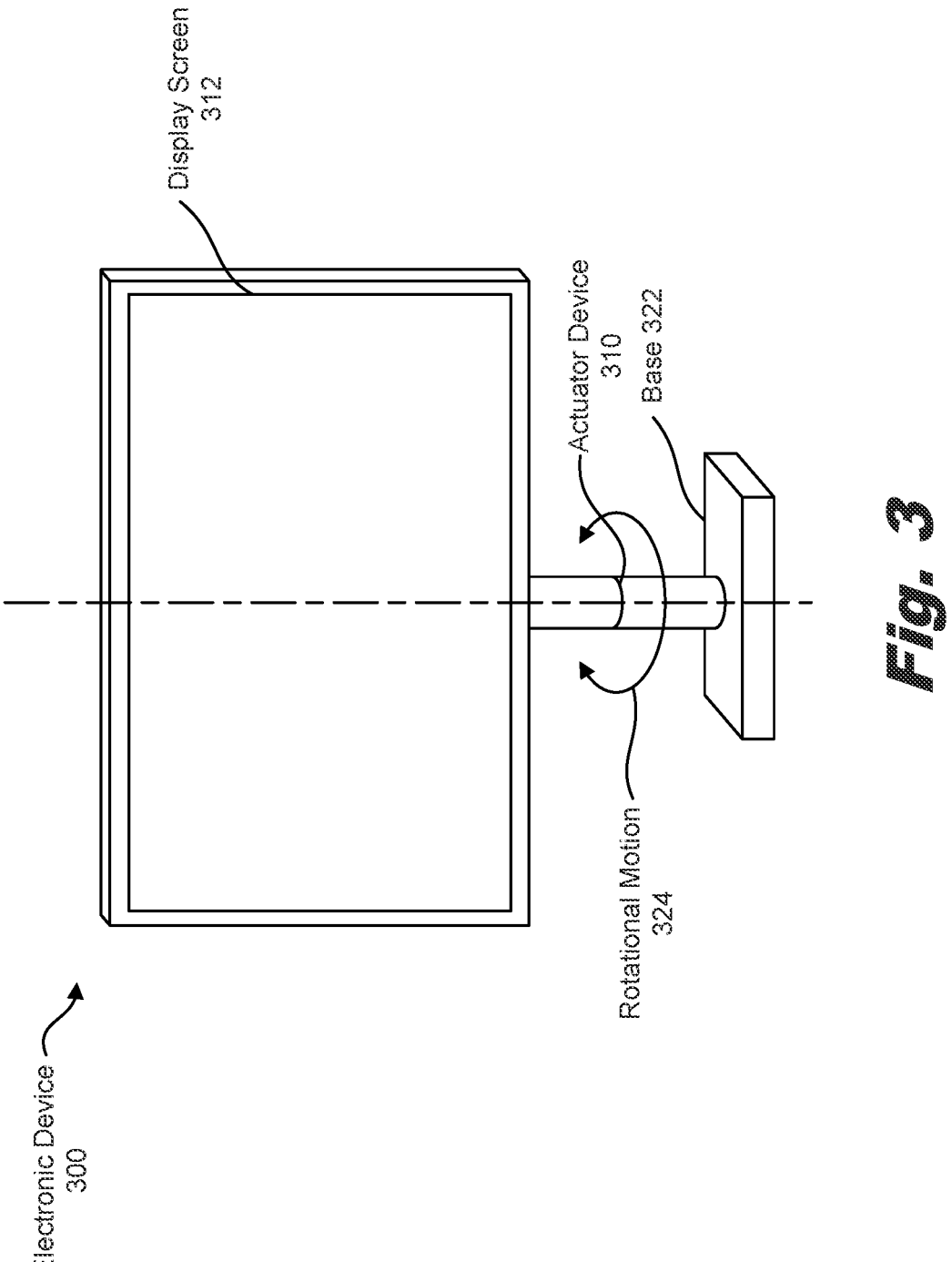
FIG. 3 illustrates an actuator device that rotates a display screen about a vertical axis, according to an example.

Turning now to FIG. 3, in this example the electronic device 300 includes a display screen 312 that is supported by a base 322. In this example, the actuator device 310 is located in a vertical structure of the base 322. The actuator device 320 may include a motor to rotate the display screen 312 about a vertical axis as represented by the rotational motion 324 about the vertical axis. Thus, the actuator device 320 in this example is a rotational actuator. In some examples, the display screen 312 is a fixed-shape screen.

Figure 4:
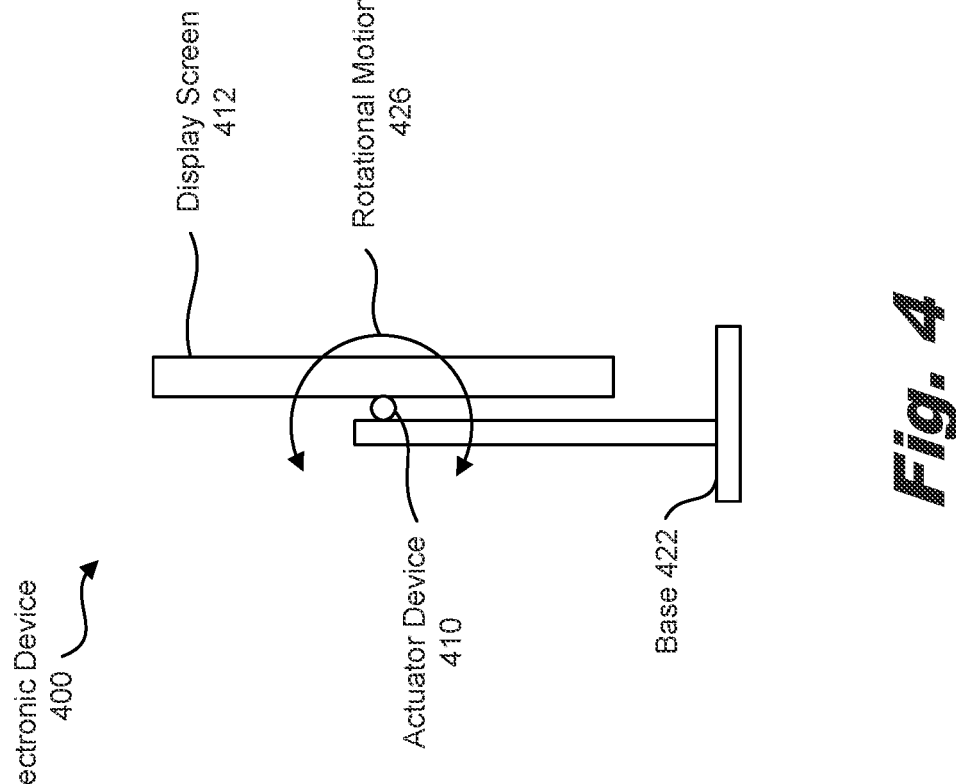
FIG. 4 illustrates an actuator device that rotates a display screen about a horizontal axis, according to an example.

Turning now to FIG. 4, in this example the electronic device 400 includes a display screen 412 that is supported by a base 422. In this example, the actuator device 410 is located at an interface between the display screen 412 and the base 422. The actuator device 420 may include a motor to rotate the display screen 412 about a horizontal axis as represented by the rotational motion 426 about the horizontal axis. Thus, the actuator device 420 may cause the display screen 412 to rotate up and down. It should be noted that in this example, the actuator device 420 attaches to an interior portion of the display screen 412. In other examples, the actuator device 420 may attach to an edge of the display screen 412. For instance, in the case of a laptop computer, the actuator device 420 may connect to the lower edge of the display screen 412 of the laptop computer in a clamshell fashion.

Figures 5A, 5B:
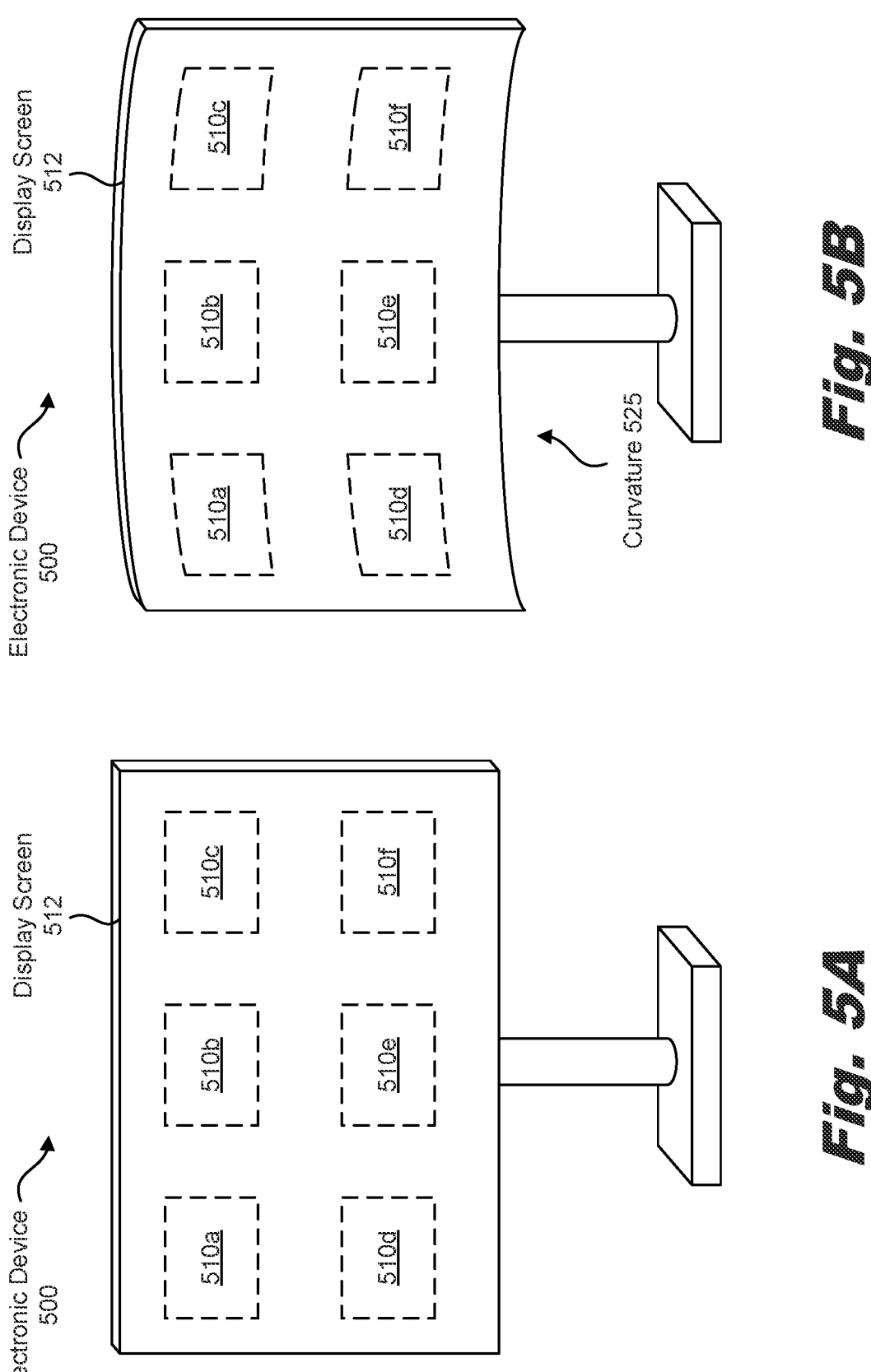
FIGS. 5A-5B illustrate an actuator device that changes the curvature of the display screen, according to an example.

Turning now to FIG. 5A, in this example, the electronic device 500 includes a flexible display screen 512. In this case, the flexible display screen 512 may change shape. For example, the flexible display screen 512 may bend in response to a force exerted on the flexible display screen 512 while still functioning to display image data.

In this example, the electronic device 500 includes a plurality of actuators 510a-f to change the curvature 525 of the display screen 512. In some examples, the plurality of actuators 510a-f may be located as an array of actuators in a grid-like pattern. In the example, of FIG. 5A, the flexible display screen 512 is shown in a flat state.

Upon activation of the plurality of actuators 510a-f, the curvature 525 of the flexible display screen 512 may change. FIG. 5B illustrates the flexible display screen 512 in a curved state. In this example, the flexible display screen 512 has a concave curvature 525 around a vertical axis. In some examples, the plurality of actuators 510a-f may cause the flexible display screen 512 to have a concave curvature around a horizontal axis. In some examples, the plurality of actuators 510a-f may cause the flexible display screen 512 to have a convex curvature around a horizontal axis, around a vertical axis, or both.

It should be noted that in the example of FIGS. 5A and 5B, a plurality of actuators 510a-f cause the flexible display screen 512 to change curvature. In other examples, a single actuator may cause the flexible display screen 512 to change curvature. In some examples, a single actuator may change a local curvature of the display screen 512. In some examples, a single actuator may change the overall curvature of the flexible display screen 512.

Figure 6:
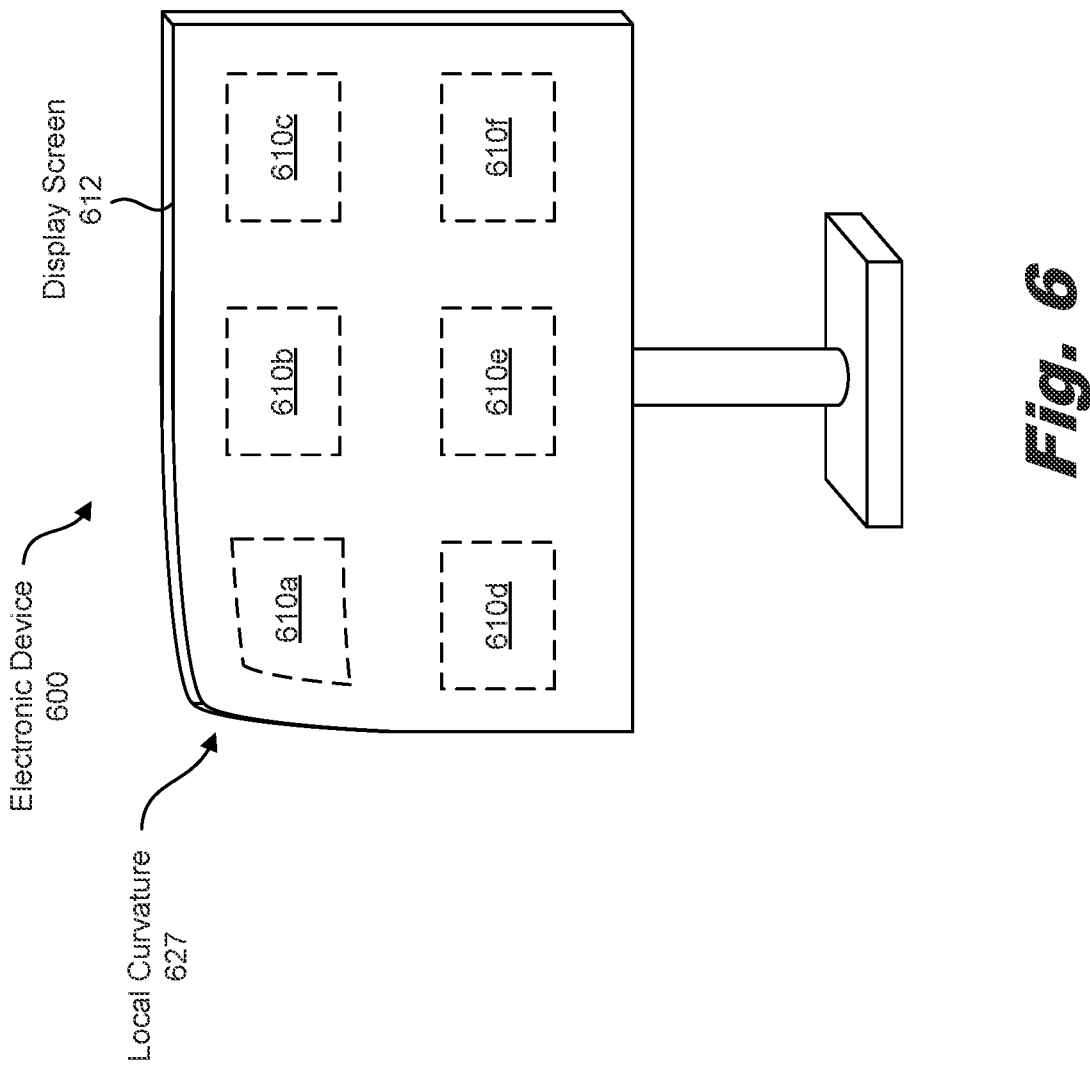
FIG. 6 illustrates an actuator device that changes a local curvature of the display screen, according to an example.

Turning now to FIG. 6, in this example, the electronic device 600 includes a flexible display screen 612. In this case, the flexible display screen 612 may change shape. For example, the flexible display screen 612 may bend in response to a force exerted on the flexible display screen 612 while still functioning to display image data. In this example, the electronic device 600 includes a plurality of actuators 610a-f to change the curvature of the display screen 612. This may be accomplished as described in FIGS. 5A-5B.

In the example of FIG. 6, the electronic device 600 adjusts a local curvature 627 of the display screen 612. For example, the actuator 610a may be activated to cause a corner of the display screen 612 to curve. In this case, the remaining actuators 610 b-f may remain inactivated, which results in the remainder of the display screen 612 (e.g., the regions of the display screen 612 that are do not move in response to activation of the actuator 610a) remaining in a flat state. It should be noted that in other examples, a subset of the plurality of actuators 610a-f may be activated to achieve a different local curvature based on how the glare is determined to reflect off of the display screen 612.

Returning now to FIG. 1, the processor 106 may receive the sensor data 104 from the sensor 102. The processor 106 may determine whether to adjust the position of the display screen 112. For example, the sensor data 104 may indicate a region of bright light that is inconsistent with light emitted by the display screen 112.

In the case where the sensor 102 is a camera, the processor 106 may detect if there is glare in the face of a user by looking for regions of bright light inconsistent with a display image as seen in a reflection of a surface within an image captured by the sensor 102. The sensor 102 may capture an image as the sensor data 104. The image may be passed to the processor 106 for analysis. In some examples, the processor 106 may be trained to find bright regions (e.g., patches) in the image. In some examples, the processor 106 may be trained to find bright regions on the face of a user. For instance, the processor 106 may perform facial detection to determine that a face is in the image. The processor 106 may then determine whether a bright region is located on the detected face.

In some examples, the processor 106 may determine a size (e.g., diameter) of a bright region in an image captured by the sensor 102. For example, the size of the bright region may indicate the severity of the glare, where a large bright region indicates more glare than a small bright region.

If the processor 106 detects the presence of glare reflecting off of the display screen 112 onto the user of an electronic device 100, then the processor may cause the actuator device 110 to adjust the position of the display screen 112 to reduce the glare. In some examples, the processor 106 may generate an adjustment signal 108 based on the sensor data 104. The adjustment signal 108 may cause the actuator device 110 to adjust the position of the display screen 112 to reduce the glare reflecting off of the display screen 112 onto the user. Thus, the adjustment signal 108 may flag a movement of the display screen 112.

In some examples, adjusting the position of the display screen 112 may include adjusting the curvature of the display screen to reflect the glare off of the face of the user. For example, in the case that the display screen 112 is a flexible display screen, the processor 106 may send an adjustment signal 108 to the actuator device 110 to change the curvature of the display screen 112. As the curvature of the display screen 112 changes, the angle of incidence of the glare reflecting off of the display screen 112 may be changed to direct the glare away from the face of the user. In the case of a plurality of actuators, the adjustment signal 108 may instruct the plurality of actuators to change the curvature of the display screen 112. In the case of a single actuator, the adjustment signal 108 may cause the single actuator to change a local curvature of the display screen 112. Thus, adjusting the curvature of the display screen 112 may include inflecting or deflecting the curvature to direct the glare away from the face of the user. As used herein, inflecting the curvature of the display screen 112 refers to bending the display screen 112.

In some examples, adjusting the position of the display screen 112 may include rotating the display screen 112 to reflect the glare off of the user. For example, in the case that the display screen 112 is a fixed-shape screen, the actuator device 110 may include a rotational actuator to rotate the display screen 112. In this case, the processor 106 may send an adjustment signal 108 to the actuator device 110 to rotate the display screen 112. As the display screen 112 rotates, the glare may be directed away from the face of the user.

In some examples, the processor 106 may adjust the position of the display screen 112 based on the size of a bright region in the sensor data 104. For example, if the bright region is large, then a larger change in position (e.g., rotational change or curvature change) may be performed to eliminate the glare since the light source is more directly reflected onto the user. In another example, if the size of the bright region is small, then the processor 106 may instruct the actuator device 110 may make a small adjustment to the position of the display screen 112.

In some examples, a feedback loop may be used to adjust the position of the display screen 112. For example, the processor 106 may make multiple adjustments to the display screen 112 based on multiple readings by the sensor 102. The processor 106 may continue to adjust the position of the display screen 112 until the glare is minimized or eliminated. In an example, the processor 106 may receive a plurality of images of the user of the electronic device 100. The processor 106 may then adjust the position of the display screen 112 to minimize the glare detected in the plurality of images.

In an example of a feedback loop to adjust the display screen position, the processor 106 may receive a first image from the sensor 102. Upon receiving the first image, the processor 106 may determine the size of the glare in the first image. For example, the processor 106 may determine the size of a bright region on the face of the user. The processor 106 may generate a first adjustment signal 108 to cause the actuator device 110 to adjust the display screen 112 to a first position.

Upon receiving a second image from the sensor 102, the processor 106 may determine the size of the glare in the second image. The processor 106 may then adjust the display screen 112 to a second position based on whether the size of the glare in the second image is less than the size of the glare in the first image. For instance, if the size of the second image glare is less than the size of the first image glare, then this indicates that the glare is being reduced by the adjustment to the display screen 112. The processor 106 may continue changing the position of the display screen 112 in the direction used to change to the first position. For example, the processor 106 may cause the display screen 112 to continue rotating in the same direction as the first position. In another example, the processor 106 may cause the display screen 112 to continue increasing or decreasing the curvature of the display screen 112 in the direction of the first position.

If the size of the second image glare is greater than the size of the first image glare, then this indicates that the display screen adjustment is increasing the glare. In this case, the processor 106 may change the position of the display screen 112 in an opposite direction used to change to the first position. For example, the processor 106 may cause the display screen 112 to rotate in the opposite direction as the first position. In another example, the processor 106 may cause the display screen 112 to curve in the opposite direction as the first position.

In some examples, the electronic device 100 is implemented within a display device. For example, the processor 106 may be an embedded controller of the display device. In this case, the processor 106 may perform the display screen adjustments without relying on the operating system (OS) or processor (e.g., CPU) of a host device. The embedded controller of the display device may receive the sensor data 104 directly from the sensor 102. The embedded controller may then make display screen adjustments to reduce glare without input from the host device OS or host device processor. In this example, the embedded controller may reduce the load on the host device OS or host device processor by autonomously performing the display screen adjustments.

The examples described herein may enhance the user experience of the electronic device 100. For example, once the processor 106 is aware of glare on the screen, the processor 106 adjust the position of the display screen 112 to reduce or eliminate the glare without the user having to physically adjust the display screen 112 to get light out of their face. In some examples, this automatic adjustment of the display screen 112 may remove glare off of the user if the glare occurs during a video presentation and the user is occupied or focused while on video.

Figure 7:
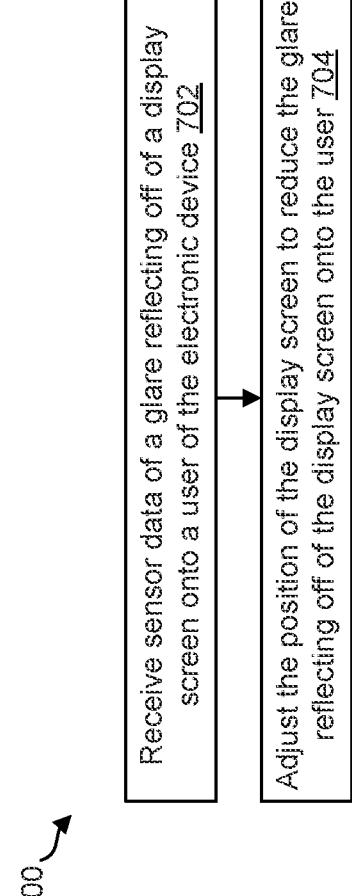
FIG. 7 is a flow diagram illustrating a method for adjusting display screen positions to reduce glare, according to an example.

FIG. 7 is a flow diagram illustrating a method 700 for adjusting display screen positions to reduce glare, according to an example. In some examples, the method 700 may be performed by an electronic device (e.g., FIG. 1, 100).

At 702, the electronic device receives sensor data of a glare reflecting off of a display screen onto a user of the electronic device. For example, a sensor may capture a light measurement. In some examples, the sensor is a camera that captures an image of the user of the electronic device.

At 704, the electronic device adjusts the position of the display screen to reduce the glare reflecting off of the display screen onto the user. For example, the electronic device may detect a bright region in the sensor data. The electronic device may then adjust the position of the display screen based on a size of the bright region.

In some examples, adjusting the position of the display screen includes rotating the display screen to reflect the glare off of the user. For example, a rotational actuator may cause the display screen to rotate in response to an adjustment signal.

In some examples, adjusting the position of the display screen includes adjusting the curvature of the display screen to reflect the glare off of the face of the user. In an example, x, y, z coordinates may be passed to the scaler of the electronic device. For instance, the x, y, z coordinates may be communicated to the scaler via an Inter-Integrated Circuit (I2C). The adjustment point for the display screen may be based on where the glare is located in the image. The scaler would then send (e.g., via I2C) the adjustment signal to shift the flexible screen actuator matrix around where the incidence of the glare is located. In this case, the flexible screen actuator matrix may be an array of adjustable electronic actuators that shift the screen regions. In another example, the actuator device may include a track that shifts the display screen in the z-direction along a base by a fixed amount.

In some examples, the electronic device may receive a plurality of images of the user of the electronic device. The electronic device may adjust the position of the display screen to minimize the glare detected in the plurality of images.

Figure 8:
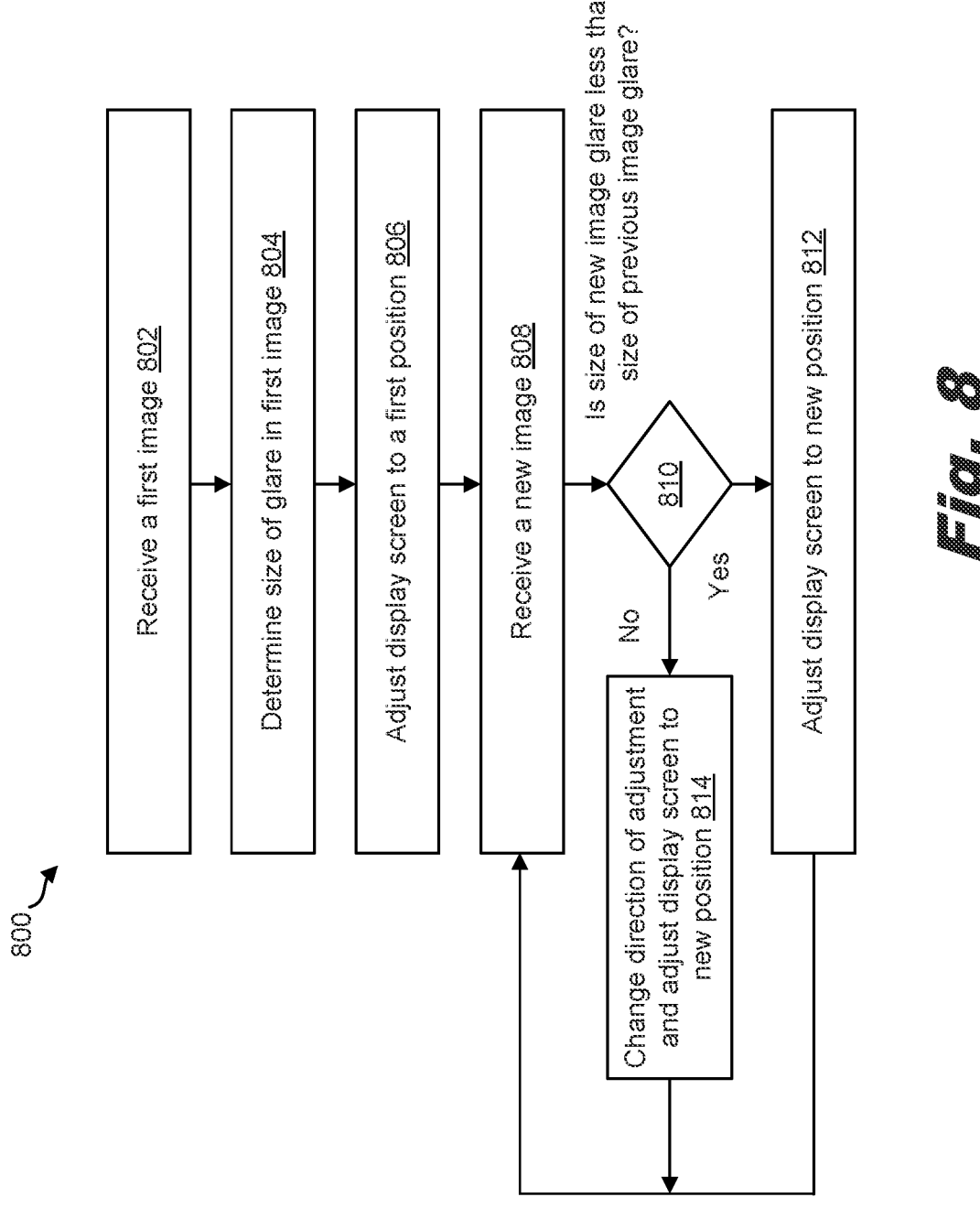
FIG. 8 is a flow diagram illustrating another method for adjusting display screen positions to reduce glare, according to an example.

FIG. 8 is a flow diagram illustrating another method 800 for adjusting display screen positions to reduce glare, according to an example. In some examples, the method 800 may be performed by an electronic device (e.g., FIG. 1, 100).

At 802, the electronic device receives a first image of a user of the electronic device. For example, a camera of the electronic device may capture an image of the user.

At 804, the electronic device may determine the size of a glare in the first image. For example, a processor (e.g., embedded controller) of the electronic device may receive the first image. The processor may detect the face of the user in the first image. The processor may detect the glare as a bright region on the face of the user, where the brightness of the region is greater than a threshold amount.

The processor may then determine the size of the glare on the face of the user. The size of the glare may be measured in area, diameter, number of pixels, or other unit of measurement.

At 806, the electronic device may adjust the display screen to a first position. In some examples, the adjustment may include rotating the display screen, changing the global curvature of the display screen, or changing a local curvature of the display screen (e.g., by actuating a single actuator in an array of actuators).

At 808, the electronic device may receive a new image of the user. The electronic device may determine the size of the glare on the face of the user in the new image. At 810, the electronic device may determine whether the size of the new image glare is less than the previous image glare. If the electronic device determines that the size of the new image glare is less than the previous image glare (810, YES), then the electronic device may adjust, at 812, the display screen to a new position in the same direction as the previous change in position. The electronic device may then receive, at 808, another new image captured at a later time to perform incremental adjustments to the position of the display screen.

If the electronic device determines that the size of the new image glare is not less than the previous image glare (810, NO), then the electronic device may change the direction of the adjustment of the display screen at. For example, if the size of the glare is increasing, this indicates that the direction of the display screen adjustment is increasing the glare. The electronic device may adjust the display screen to a new position in the new direction. For example, the electronic device may rotate the display screen to a new position in a direction opposite the prior position. In another example, the electronic device may adjust the global curvature of a flexible display screen in an opposite direction. In yet another example, the electronic device may adjust the local curvature of a flexible display screen by selecting a different actuator to bend the flexible display screen. in an opposite direction stay at the current position. is being adjusted in adjust the display screen to a new position in the same direction as the previous change in position. The electronic device may then receive, at 808, another new image captured at a later time to perform incremental adjustments to the position of the display screen.

Figure 9:
FIG. 9 depicts a non-transitory machine-readable storage medium for adjusting display screen positions to reduce glare, according to an example.

FIG. 9 depicts a non-transitory machine-readable storage medium 930 for adjusting display screen positions to reduce glare, according to an example. To achieve its desired functionality, an electronic device (e.g., electronic device 100) includes various hardware components. Specifically, an electronic device includes a processor and a machine-readable storage medium 930. The machine-readable storage medium 930 is communicatively coupled to the processor. The machine-readable storage medium 930 includes a number of instructions 932, 934, 936 for performing a designated function. The machine-readable storage medium 930 causes the processor to execute the designated function of the instructions 932, 934, 936. The machine-readable storage medium 930 can store data, programs, instructions, or any other machine-readable data that can be utilized to operate the electronic device. Machine-readable storage medium 930 can store computer readable instructions that the processor of the electronic device 100 can process or execute. The machine-readable storage medium 930 can be an electronic, magnetic, optical, or other physical storage device that contains or stores executable instructions. Machine-readable storage medium 930 may be, for example, Random Access Memory (RAM), an Electrically Erasable Programmable Read-Only Memory (EEPROM), a storage device, an optical disc, etc. The machine-readable storage medium 930 may be a non-transitory machine-readable storage medium 930, where the term "non-transitory" does not encompass transitory propagating signals.

Referring to FIG. 9, receive image instructions 932, when executed by the processor, may cause the processor to receive an image of a user of an electronic device. In some examples, the electronic device includes a camera to capture the image of the user. The image may be provided to the processor. Determine glare instructions 934, when executed by the processor, may cause the processor to determine that a glare reflects off of a display screen onto a face of the user in the image. In some examples, the display screen includes a flexible screen having a curvature. Adjust curvature instructions 936, when executed by the processor, may cause the processor to adjust the curvature of the display screen to reduce the glare reflecting off of the display screen onto the user.

In some examples, adjusting the curvature of the display screen includes inflecting the curvature to direct the glare away from the face of the user. In some examples, adjusting the curvature of the display screen includes sending an adjustment signal to an actuator device to change the curvature of the display screen. In some examples, adjusting the curvature of the display screen includes sending an adjustment signal to a plurality of actuators to change the curvature of the display screen.

The above specification, examples, and data provide a description of the devices, processes and methods of the disclosure. Because many examples can be made without departing from the spirit and scope of the disclosure, this specification sets forth some of the many possible example approaches and implementations.

What is claimed is:

1. An electronic device, comprising:
   a display screen;
   a sensor to capture sensor data of a glare reflecting off of the display screen onto a user of the electronic device;
   an actuator device to adjust a position of the display screen; and
   a processor to:

detect a presence of the glare on the user based on the sensor data, and generate an adjustment signal based on the sensor data, the adjustment signal to cause the actuator device to adjust the position of the display screen to reduce the glare reflecting off of the display screen onto the user.

2. The electronic device of claim 1, wherein the sensor comprises a camera.

3. The electronic device of claim 1, wherein the display screen comprises a flexible screen having a curvature.

4. The electronic device of claim 3, wherein the actuator device comprises a plurality of actuators to change the curvature of the display screen in response to the adjustment signal.

5. The electronic device of claim 3, wherein the actuator device comprises a single actuator to change a local curvature of the display screen in response to the adjustment signal.

6. The electronic device of claim 1, wherein the display screen comprises a fixed-shape screen, and wherein the actuator device comprises a rotational actuator to rotate the display screen in response to the adjustment signal.

7. The electronic device of claim 1, wherein the sensor data is a glare measurement.

8. The electronic device of claim 1, wherein, to detect the presence of the glare on the user based on the sensor data, the processor is to determine a size of the glare, and wherein the adjustment signal is further based on the size of the glare.

9. The electronic device of claim 1, wherein the sensor is a camera, the sensor data includes an image of the user, and to detect the presence of the glare on the user based on the sensor data, the processor is to determine that the glare reflects off of the display screen onto a face of the user in the image.

10. The electronic device of claim 1, wherein the sensor is a camera, the sensor data includes a plurality of images of the user, and to generate an adjustment signal based on the sensor data, the processor is to: adjust the position of the display screen to minimize the glare detected in the plurality of images.

11. The electronic device of claim 1, wherein, to generate an adjustment signal based on the sensor data, the processor is to: adjust a curvature of the display screen to inflect the curvature to direct the glare away from the user.

12. The electronic device of claim 1, wherein the sensor is a camera, the sensor data includes a first image and a second image, and wherein, to detect a presence of the glare on the user based on the sensor data and to generate the adjustment signal, the processor is to: determining a size of the glare in the first image; adjusting the display screen to a first position; determining the size of the glare in the second image; and adjusting the display screen to a second position based on whether the size of the glare in the second image is less than the size of the glare in the first image.

13. The electronic device of claim 1, wherein the actuator device includes a plurality of actuators including a first actuator, and the adjustment signal is to cause the first actuator to change a local curvature of the display screen.

14. The electronic device of claim 13, wherein the plurality of actuators is arranged in a grid-like pattern.

15. The electronic device of claim 13, wherein a subset of remaining actuators of the plurality of actuators is inactive while the first actuator of the plurality of actuators is activated.

16. The electronic device of claim 13, wherein the adjustment signal causes a subset of actuators of the plurality of actuators to activate and adjust the position of the display.

17. The electronic device of claim 13, wherein the local curvature corresponds to a portion of the display screen and the curvature corresponds to remaining portions of the display screen, and wherein the local curvature is different from the curvature.

\* \* \* \* \*